United States Patent
Hirao

(10) Patent No.: US 10,637,336 B2
(45) Date of Patent: Apr. 28, 2020

(54) STATOR COIL FORMING METHOD

(71) Applicant: TOYOTA JIDOSHA KABUSHIKI KAISHA, Toyota-shi, Aichi-ken (JP)

(72) Inventor: Yasuyuki Hirao, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 15/287,090

(22) Filed: Oct. 6, 2016

(65) Prior Publication Data

US 2017/0117782 A1    Apr. 27, 2017

(30) Foreign Application Priority Data

Oct. 23, 2015   (JP) .................. 2015-208860

(51) Int. Cl.
*H02K 15/085*   (2006.01)
*H02K 15/04*    (2006.01)
*H02K 3/12*     (2006.01)
*H02K 15/00*    (2006.01)

(52) U.S. Cl.
CPC ........... *H02K 15/0421* (2013.01); *H02K 3/12* (2013.01); *H02K 15/085* (2013.01); *H02K 15/0037* (2013.01); *H02K 15/0081* (2013.01)

(58) Field of Classification Search
CPC .... H02K 15/0421; H02K 3/12; H02K 15/085; H02K 15/0081; H02K 15/0037; Y10T 29/49009; Y10T 29/49011; Y10T 29/49073
USPC .................................................... 29/596, 735
See application file for complete search history.

(56) References Cited

U.S. PATENT DOCUMENTS

| | | | | | |
|---|---|---|---|---|---|
| 4,739,643 | A | * | 4/1988 | Kuriyama | .......... H02K 15/0421 72/306 |
| 5,210,928 | A | * | 5/1993 | Seshita | ................... B23K 11/11 29/596 |
| 6,314,780 | B1 | * | 11/2001 | Naka | .................. H02K 15/0414 72/213 |
| 6,865,796 | B1 | * | 3/2005 | Oohashi | ................... H02K 3/12 242/432 |

(Continued)

FOREIGN PATENT DOCUMENTS

| | | |
|---|---|---|
| JP | 2004236375 A | 8/2004 |
| JP | 2004328861 A | 11/2004 |

(Continued)

*Primary Examiner* — Peter Dungba Vo
*Assistant Examiner* — Kaying Kue
(74) *Attorney, Agent, or Firm* — Oliff PLC

(57) ABSTRACT

A stator coil forming method includes a bending step of bending portions of a linear lead wire so as to form bent portions; a cutting step of cutting curve parts of the bent portions thus formed, along a perpendicular plane that is approximately perpendicular to an extending direction of the lead wire so as to form coil segments; a U-shape forming step of bending the coil segments in a U-shape; an assembling step of assembling the coil segments to respective slots of a stator core; a tilting step of tilting both distal ends of the coil segments in a circumferential direction of the stator core so that cut surfaces of the distal ends are oriented toward a central-axis direction of the stator core; and a joining step of joining the distal ends of the coil segments adjacent to each other in a radial direction of the stator core.

7 Claims, 12 Drawing Sheets

(56) References Cited

U.S. PATENT DOCUMENTS

| | | | | |
|---|---|---|---|---|
| 6,894,415 B2 * | 5/2005 | Koike | H02K 3/12 | 310/180 |
| 9,979,265 B2 * | 5/2018 | Hattori | H02K 3/38 | |
| 2003/0015932 A1 * | 1/2003 | Oohashi | H02K 3/12 | 310/201 |
| 2003/0067239 A1 * | 4/2003 | Nakamura | H02K 3/12 | 310/201 |
| 2003/0102761 A1 * | 6/2003 | Wada | H02K 3/12 | 310/208 |
| 2006/0103255 A1 * | 5/2006 | Seguchi | H02K 3/12 | 310/201 |
| 2008/0143212 A1 * | 6/2008 | Fusegawa | H01R 39/04 | 310/236 |
| 2009/0096311 A1 * | 4/2009 | Even | H02K 3/12 | 310/198 |
| 2012/0326551 A1 * | 12/2012 | Kinpara | H02K 3/12 | 310/180 |
| 2014/0159538 A1 * | 6/2014 | Hasegawa | H02K 3/345 | 310/215 |
| 2014/0223727 A1 * | 8/2014 | Watanabe | H01F 41/04 | 29/602.1 |
| 2014/0225465 A1 * | 8/2014 | Goto | B23K 9/167 | 29/596 |
| 2015/0076945 A1 * | 3/2015 | Kudou | H02K 3/28 | 310/71 |
| 2015/0171716 A1 * | 6/2015 | Kurashige | H02K 15/0081 | 72/374 |
| 2015/0364977 A1 * | 12/2015 | Hattori | H02K 3/38 | 310/208 |
| 2019/0109523 A1 * | 4/2019 | Miyazaki | H02K 3/04 | |
| 2019/0109524 A1 * | 4/2019 | Watanabe | H02K 3/04 | |

FOREIGN PATENT DOCUMENTS

| | | |
|---|---|---|
| JP | 2006304507 A | 11/2006 |
| JP | 2014161176 A | 9/2014 |

* cited by examiner

SHIFT DIRECTION

SHIFT DIRECTION

STATOR COIL FORMING METHOD

INCORPORATION BY REFERENCE

The disclosure of Japanese Patent Application No. 2015-208860 filed on Oct. 23, 2015 including the specification, drawings and abstract is incorporated herein by reference in its entirety.

BACKGROUND

1. Technical Field

The present disclosure relates to a stator coil forming method for a motor.

2. Description of Related Art

There has been known a stator coil forming method in which U-shaped lead wires are assembled to respective slots of a stator core, and distal ends of the lead wires are tilted in a circumferential direction of the stator core and then twisted, so that coil-end end surfaces of coil segments are formed horizontally relative to an axial end surface of the stator core, thereby forming coil ends which are reduced in a volume in a stator-core axial direction and which have no straight part (see Japanese Patent Application Publication No. 2006-304507 (JP 2006-304507 A)).

In the stator coil forming method, the coil ends are inserted into a groove of a toric jig and the toric jig is moved up and down while being rotated, so that the coil ends are deformed plastically while being tilted in the circumferential direction of the stator core. By this process, the coil ends that have no straight part are formed. However, referring to FIG. 13, when coil ends 201 are tilted in a circumferential direction of a stator core 202, it is necessary to secure an insulation distance between distal ends 203 adjacent to each other in the circumferential direction (side faces of the distal ends 203 of the coil ends 201 adjacent to each other in the circumferential direction, the side faces being opposed to each other). For example, like a circled part in FIG. 13, the distal end 203 is cut diagonally. Because of this, a cut margin of the lead wire is wasted, which causes a poor yield. Further, in this case, a distance between the coil ends 201 adjacent to each other in the circumferential direction is shortened, so welded parts of the coil ends 201 come closer to each other in the circumferential direction. In the welded parts, an insulating coating is removed. This further increases waste of material.

SUMMARY

The present embodiments provide a stator coil forming method which decreases a cut margin of a lead wire and achieves a good yield.

A first aspect relates to a stator coil forming method including: a bending step of bending portions of a linear lead wire with respect to a continuous (extending) direction of the lead wire so as to form bent portions; a cutting step of cutting curve parts of the bent portions, along a perpendicular plane that is perpendicular to a continuous direction (an arc) of the bent portions so as to form coil segments; a U-shape forming step of bending the coil segments in a U-shape; an assembling step of inserting distal ends of the coil segments into a plurality of slots of a toric stator core so as to assemble the coil segments to the slots of the stator core, the plurality of slots extending parallel to a central axis of the stator core; a tilting step of tilting the distal ends of the coil segments, in a circumferential direction of the stator core so that cut surfaces of the distal ends are oriented toward a central-axis direction of the stator core; and a joining step of joining adjacent distal ends of the coil segments, the adjacent distal ends being adjacent to each other in a radial direction of the stator core.

According to the first aspect, the bent portions are formed by bending portions of the linear lead wire in the continuous (extending) direction of the lead wire. The bent portions thus formed are cut out along the perpendicular plane perpendicular to the continuous direction of the curve parts. By this process, R-bending can be performed naturally on a side face of each coil end. The side surface of the coil end is a distal end of the coil segment and is adjacent to another coil segment in the circumferential direction of the stator core. Further, it is possible to secure a large insulation distance between the distal ends of the coil segments adjacent to each other in the circumferential direction without partially removing the distal ends of the coil ends. That is, a cut margin (material that is wasted due to being removed by cutting) of the lead wire is decreased, thereby making it possible to form a stator coil with a good yield.

In the first aspect, the bending step may form a plurality of bent portions.

Further, in the first aspect, in the tilting step, the distal ends of the coil segment may be tilted in the circumferential direction of the stator core and in a tangential direction to an inner periphery of the stator core. By this process, when the coil segments are pushed down by a jig, the coil segments are not just pushed down along the circumferential direction of the stator core, but are pushed down slightly toward an outer peripheral side of the inner periphery of the stator core so as not to interfere with the jig. This makes it possible to prevent an unexpected physical interference between the jig and the coil segments at the time when the coil segments are pushed down.

Further, in the first aspect, a coating may be provided on the lead wire, and the stator coil forming method may further include: a pressurization step of applying pressure to the bent portions toward one direction parallel to a cut direction of the bent portions so as to deform the bent portions; and a peeling step of peeling off the coating on respective end surfaces of the distal ends of the coil segments, the end surfaces being on a pressure-direction side of the bent portions. By this process, in the distal ends of the coil segments, the coating on the end surface on the pressure-direction side is peeled off and welding is performed thereon. The end surface on the pressure-direction side is offset on the pressure-direction side due to the applied pressure. This makes it possible to reduce a gap formed between joint parts due to steps formed between each joint part in which the coating is peeled off and a part in which the coating remains. Accordingly, it is possible to increase a degree of adhesion between welded parts at the time of welding.

According to the disclosed embodiments, it is possible to provide a stator coil forming method which decreases a cut margin of a lead wire and achieves a good yield.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

With reference to drawings, the following describes an embodiment. A stator coil forming method according to one embodiment is used when a stator coil is formed. The stator coil is used for a driving motor of a hybrid vehicle, an electric vehicle, or the like.

Figure 1:
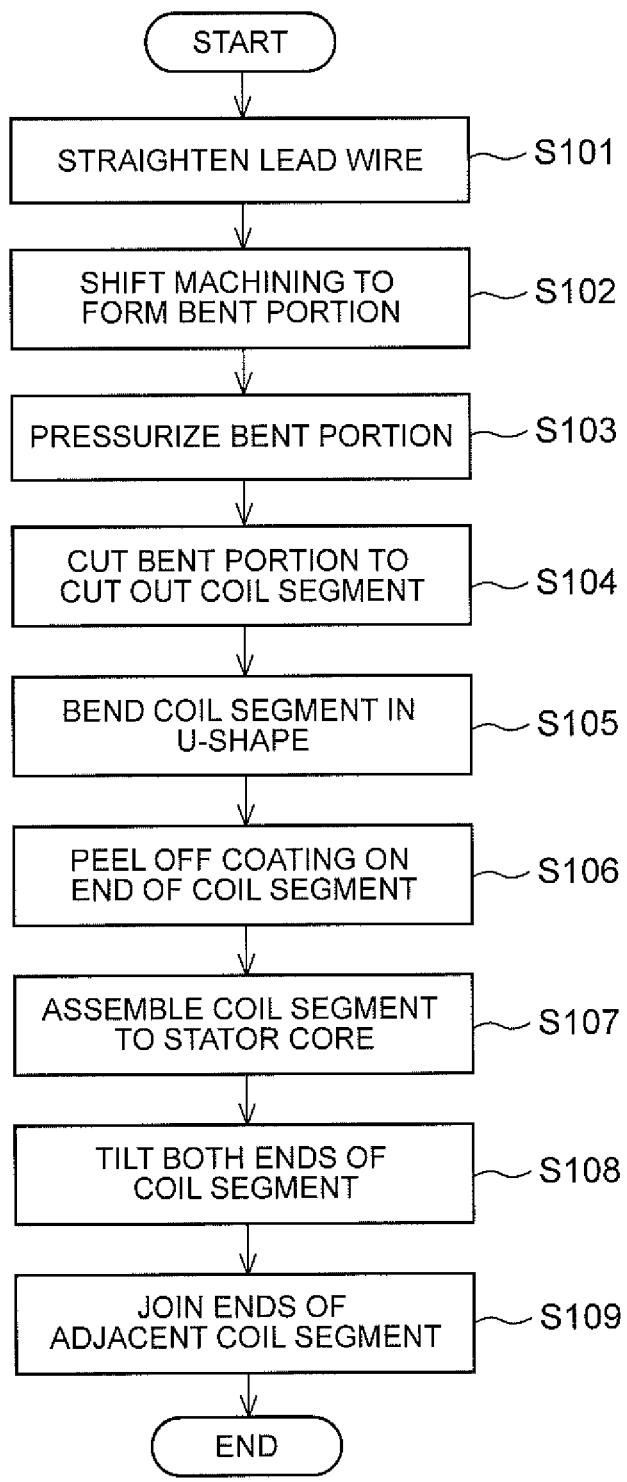
FIG. 1 is a flowchart illustrating a flow of a stator coil forming method according to one embodiment.

The stator coil forming method according to the present embodiment includes: a bending step of forming a plurality of bent portions; a pressurization step of pressurizing the bent portions; a cutting step of cutting out coil segments; a peeling step of partially peeling off coatings of distal ends of the coil segments; a U-shape forming step of bending the coil segments in a U-shape; an assembling step of assembling the coil segments to respective slots of a stator core; a tilting step of tilting both distal ends of the coil segments in a circumferential direction of the stator core; and a joining step of joining the distal ends of the coil segments to each other. FIG. 1 is a flowchart illustrating a flow of a stator coil forming method according to one embodiment.

Figure 2:
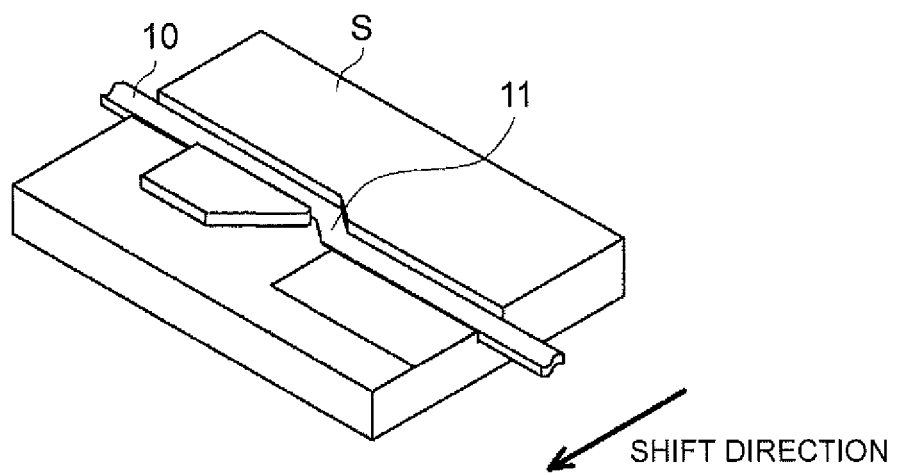
FIG. 2 is a view illustrating one example of a die formed so that part of a linear lead wire is shifted in a stepped manner.
Figure 2:
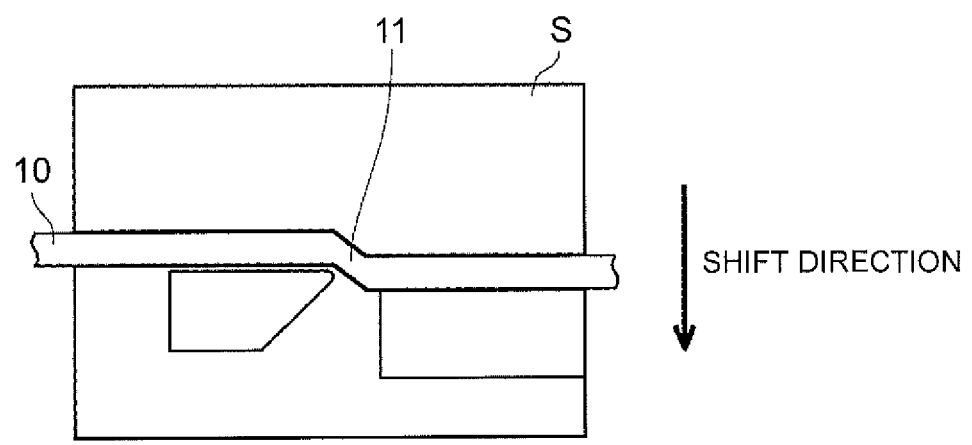

In the bending step, a lead wire having a coating and wound around a bobbin is drawn out, and straightening is performed on the lead wire so that the lead wire thus drawn out is straightened by use of a roller or the like (step S101). Subsequently, as illustrated in FIG. 2, the linear lead wire 10 subjected to the straightening is fitted into a die S formed in advance, so as to form a bent portion 11 (step S102). The die S is formed such that the linear lead wire 10 is partially bent with respect to a continuous direction (an extending direction) of the lead wire and then shifted in a stepped manner. Note that a shift amount thereof is set in advance so that optimum R-bending can be performed on a distal end 121 of each coil segment 12 (described later).

By fitting the linear lead wire 10 into the die S at positions determined in advance at regular intervals, a plurality of bent portions 11 are formed in the linear lead wire 10 in a lead-wire direction at regular intervals. Thus, in the bending step, portions of the linear lead wire 10 are bent with respect to the continuous direction of the lead wire 10 at regular intervals, and then shifted in a stepped manner. By this process, the plurality of bent portions 11 are formed.

Figure 3:
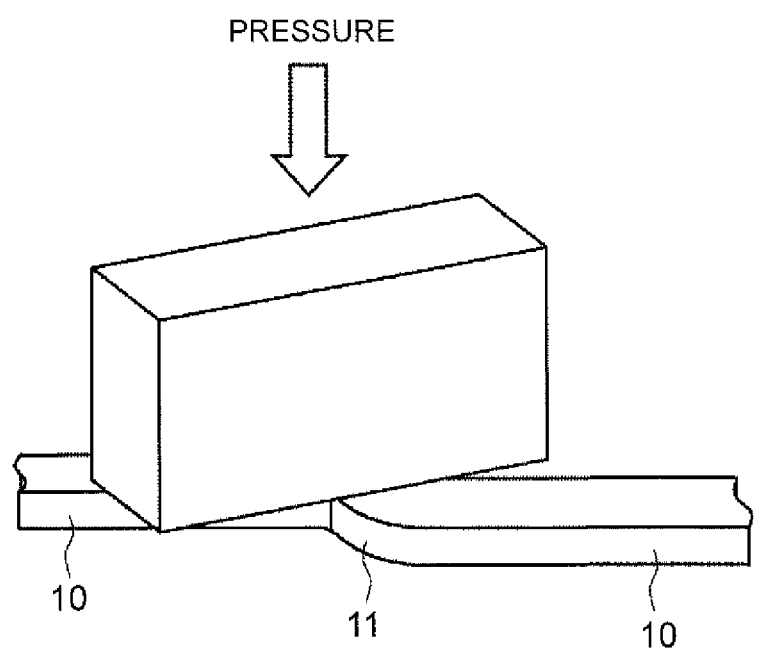
FIG. 3 is a view illustrating a state in which a bent portion is pressurized.
Figures 14A, 14B:
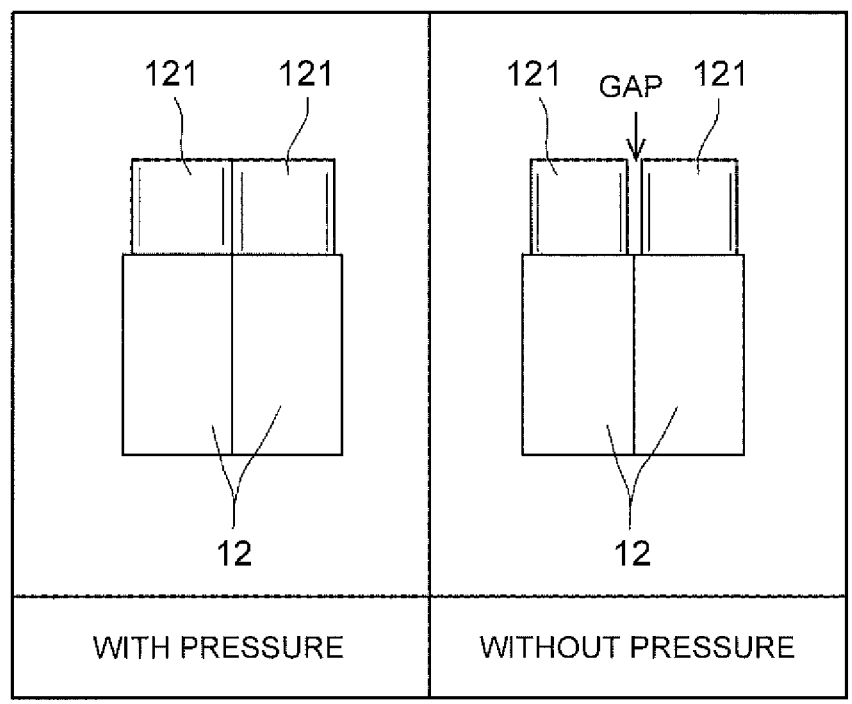
FIG. 14A is a view illustrating a case where the distal ends of the coil segments are pressurized.
FIG. 14B is a view illustrating a case where the distal ends of the coil segments are not pressurized.

As illustrated in FIG. 3, in the pressurization step, the bent portions 11 formed in the bending step are pressurized (have pressure applied to them to cause them to deform) by use of a pressing machine (step S103). Note that, in a case without the pressurization step, at the time when coatings of distal ends 121 of coil segments 12 are peeled off in the peeling step and peeled parts of adjacent distal ends 121 of the coil segments 12 are then joined to each other, a gap is formed between the peeled parts (FIG. 14B). However, when to-be-peeled surfaces of the bent portions 11 are pressurized in the pressurization step, it is possible to prevent such a gap from being formed (FIG. 14A). That is, it is possible to reduce a gap to be formed between joint parts of distal ends 121 of coil segments 12 due to steps formed in the distal ends 121. The step is formed in the distal end 121 between a joint part in which a coating is peeled off and a part in which the coating remains. Accordingly, it is possible to increase a degree of adhesion between welded parts at the time of welding.

Figure 4:
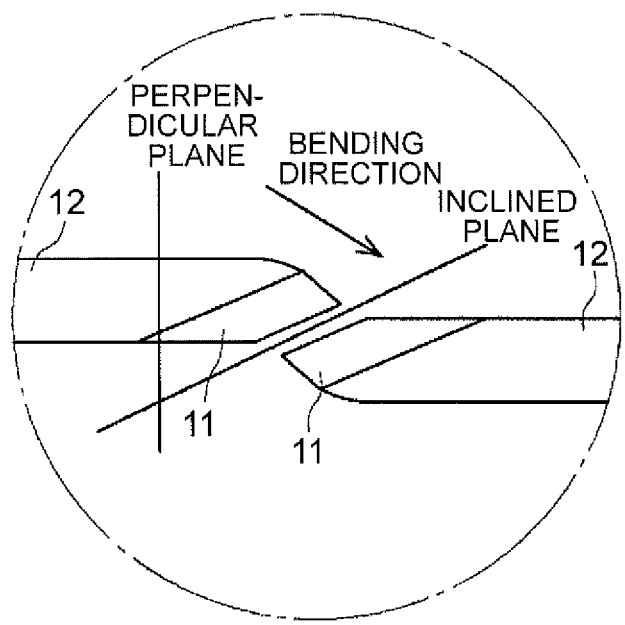
FIG. 4 is a view illustrating a state where the bent portion is cut diagonally with respect to a lead-wire direction.
Figure 4:
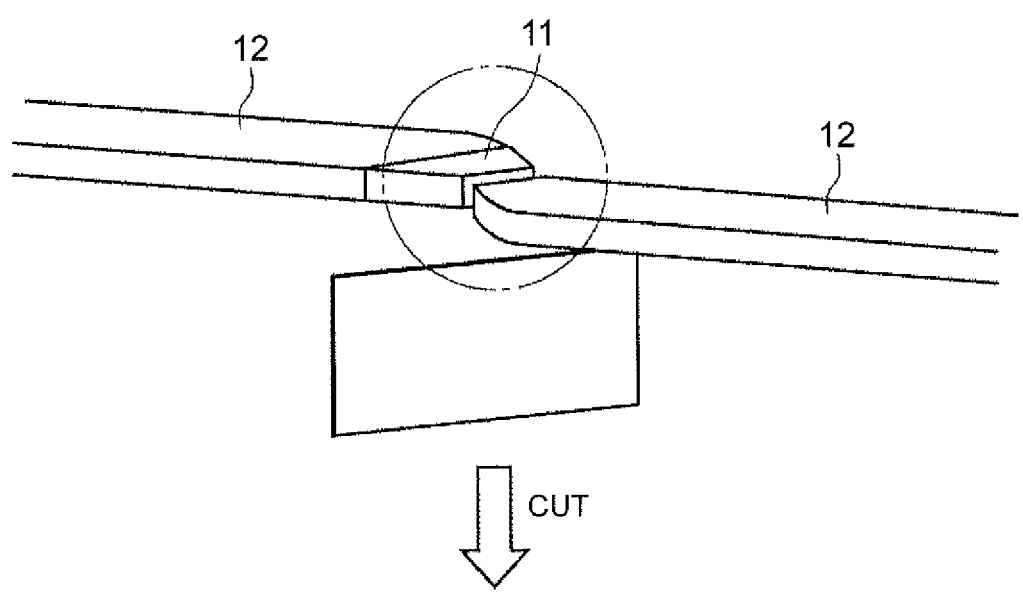

In the cutting step, the bent portions 11 pressurized in the pressurization step are cut by use of a cutting machine, so as to cut out coil segments 12 (step S104). As illustrated in FIG. 4, the bent portion 11 is cut diagonally on an inclined plane inclined along a bending direction, with respect to a perpendicular plane perpendicular to the lead-wire direction (the bent portion 11 is cut along a perpendicular plane that is approximately (substantially) perpendicular to a continuous direction (an arc) of the curve parts of the lead wire 10). Note that an inclination angle of the inclined plane is set so that generally the same R-curve surface R1 is formed in the distal end 121 of each of the coil segments 12 formed by cutting the bent portions 11. By cutting the lead wire 10 while the lead wire 10 is shifted in a stepped manner as such, a wasteful cut margin of the lead wire at the time of the cutting is not generated, thereby making it possible to reduce a cost of a material of the lead wire, which leads to a cost reduction.

Figure 5A:
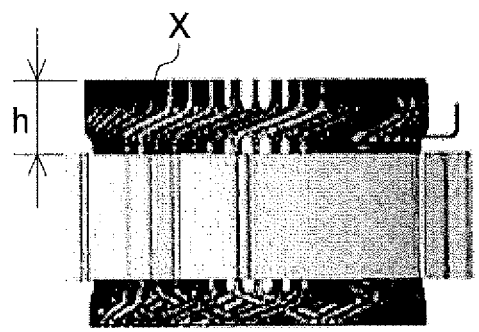
FIG. 5A is a view illustrating a coil end height of a stator coil in the related art.
Figure 13:
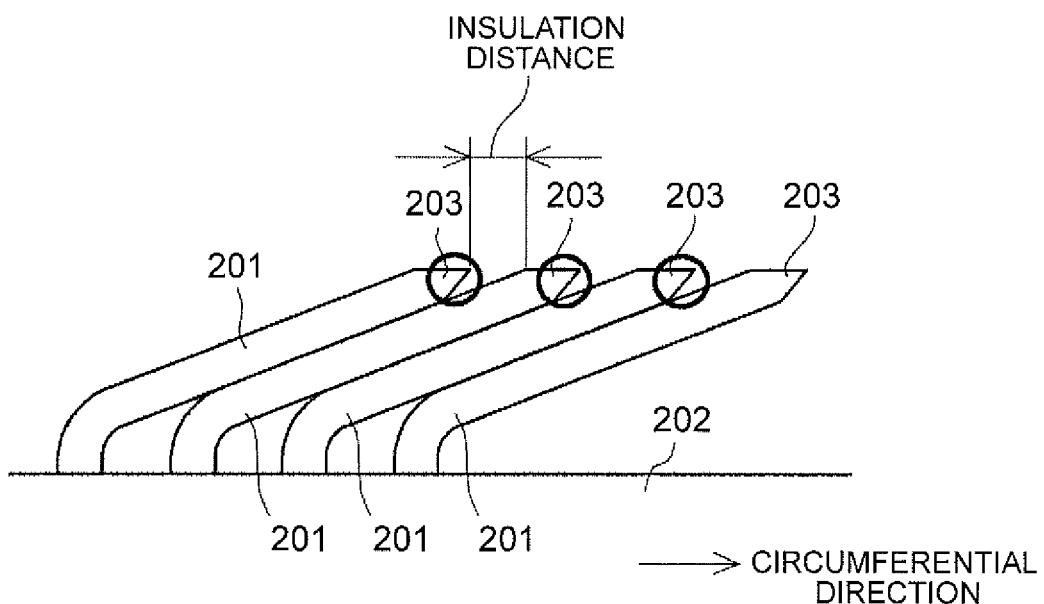
FIG. 13 is a view illustrating an insulation distance in a case where distal ends of coil segments are cut.

In the meantime, in a stator coil forming method in the related art, a straight part X serving as a twisted grip portion or a joint margin is formed in a distal end of a coil segment (FIG. 5A). The straight part X increases a coil end height h and makes it difficult to downsize a stator coil, which leads to an increase in the cost of the material of the lead wire. Note that, when the distal end of the coil segment is cut diagonally and the coil segment is twisted first, a stator coil that does not have the straight part X can be formed. However, when both distal ends 203 of the coil segments 201 are tilted in a circumferential direction of a stator core 202, it is difficult to secure an insulation distance between the distal ends 203 adjacent to each other in the circumferential direction (side faces of the distal ends 203 of the coil segments 201 adjacent to each other in the circumferential direction, the side faces being opposed to each other). In this case, if the distal end 203 of the coil segment 201 is cut on two sides (FIG. 13), its cut margin (a wasted part of the lead wire) decreases its yield.

Figure 6:
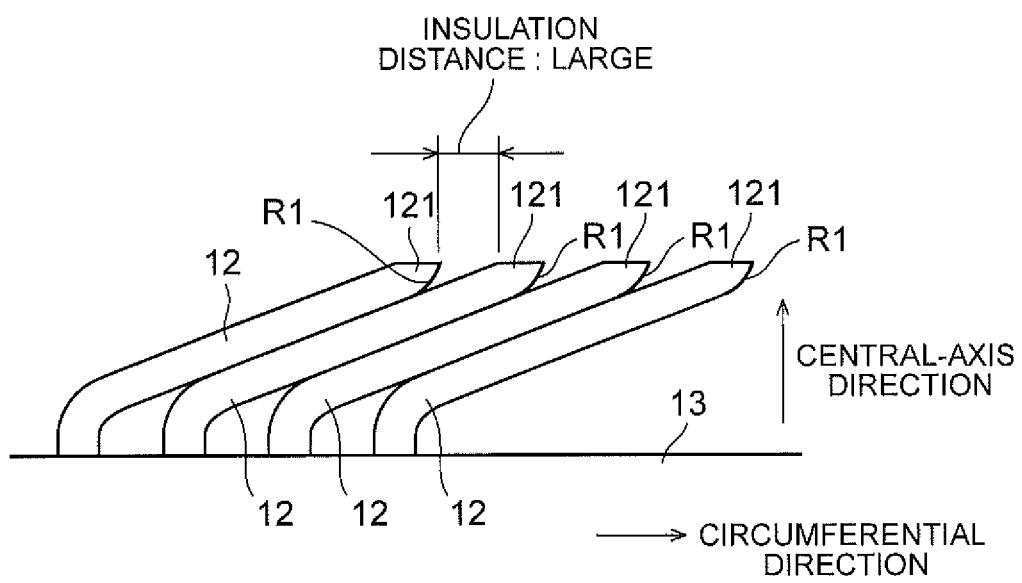
FIG. 6 is a view illustrating an insulation distance between distal ends of adjacent coil segments.

In this regard, in the stator coil forming method according to the present embodiment, the curve part of the bent portion 11 formed by partially bending the linear lead wire 10 in the continuous direction of the lead wire 10 is cut out along the perpendicular plane that is perpendicular to the continuous direction of the curve parts, as described above. By this process, R-bending can be naturally performed on the distal ends 121 of the coil segments 12 in a state where the distal ends 121 have a coating. By performing the R-bending on the distal ends 121, when both distal ends 121 of the coil segments 12 are tilted in the circumferential direction of the stator core 13, it is possible to secure an insulation distance between the distal ends 121 adjacent to each other in the circumferential direction (side faces of the distal ends 121 of the coil segments 12 adjacent to each other in the circumferential direction, the side faces being opposed to each other), as illustrated in FIG. 6. Accordingly, since no cut margin is generated at the time of cutting the bent portions 11, a good yield is obtained, which leads to a reduction in the cost of the material of the lead wire. That is, according to the stator coil forming method of the present embodiment, it is possible to form the stator coil 1 that causes no cut margin of the lead wire and achieves a good yield. Note that, since a coating is left on an R-curve surface R1, there is such a merit that it is not necessary to cover this part with an insulating material.

Figure 5B:
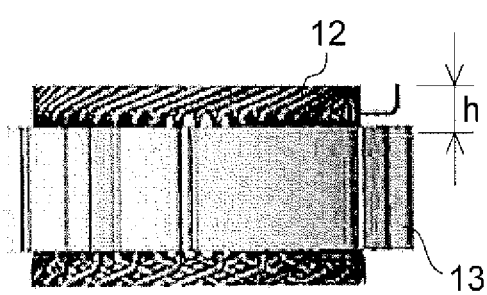
FIG. 5B is a view illustrating a coil end height in the present embodiment.

Further, since no straight part is provided, it is possible to shorten a coil end height h (FIG. 5B). This makes it possible to easily downsize the stator coil 1. Particularly, a stator core used for a motor for driving a hybrid vehicle requires shortening of the coil end height h in milliunits. Accordingly, the shortening of the coil end height h is a great benefit.

In the U-shape forming step, the coil segments 12 thus cut out in the cutting step are bent in a U-shape (step S105). In the peeling step, coatings (insulating films) of end surfaces of the distal ends 121 of the coil segments 12 thus bent in the U-shape forming step are peeled off (step S106). The end surfaces of the distal ends 121 are on a pressure-direction side. In the peeling step, coatings on side surfaces adjacent to respective cut surfaces of the distal ends 121 of the coil segments 12 are peeled off by a laser. By performing the laser peeling as such, it is possible to largely reduce a machining cost due to a reduction in an equipment cost for a cutting tool and easiness in machining, in comparison with peeling by a conventional cutting tool.

The side surfaces subjected to the peeling herein are contact surfaces of distal ends adjacent to each other in a radial direction of the stator core 13 when both distal ends 121 of the coil segments 12 are tilted in the circumferential direction of the stator core 13. Although more equipment cost is required as compared with the laser peeling as described above, the coatings of the distal ends 121 of the coil segments 12 may be peeled off by a cutting tool or the like. Further, the peeling step may be performed after the cutting step and before the U-shape forming step.

In the assembling step, the coil segments 12 subjected to the peeling in the peeling step are assembled to respective slots of the stator core 13 (step S107). The stator core 13 is configured such that steel sheets are laminated and fixed to each other, for example. The steel sheets are formed by performing pressing and punching on directional silicon steel plates.

The stator core 13 is formed in a tone shape, for example, and a plurality of slots is formed in parallel to a central axis of the stator core 13. In the assembling step, both distal ends 121 of the U-shaped coil segment 12 are inserted into the slots of the stator core 13, so that the coil segment 12 is assembled to the slots of the stator core 13.

Figure 7:
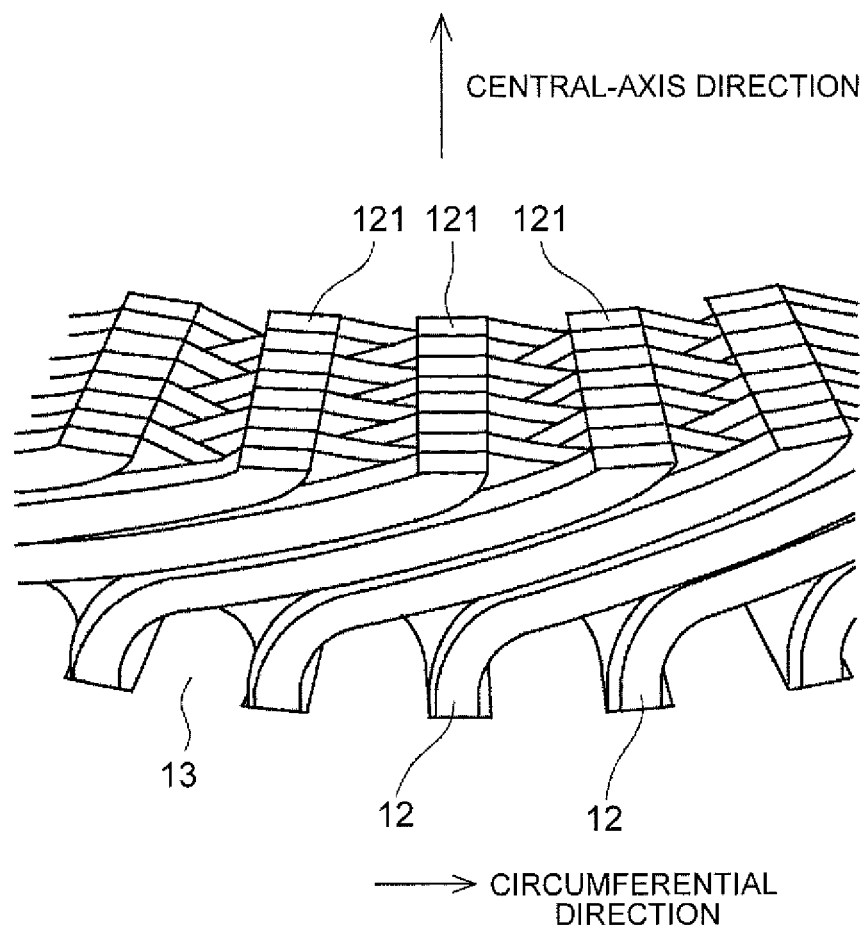
FIG. 7 is a view illustrating one example of a state where coil segments are tilted.

In the tilting step, both distal ends 121 of the coil segment 12 assembled to the stator core 13 are tilted in the circumferential direction of the stator core 13 (step S108). In the tilting step, both distal ends 121 of the coil segment 12 thus assembled are tilted in the circumferential direction of the stator core 13 so that the cut surfaces of the distal ends 121 are oriented toward the central-axis direction of the stator core 13 (FIG. 7).

Figure 8:
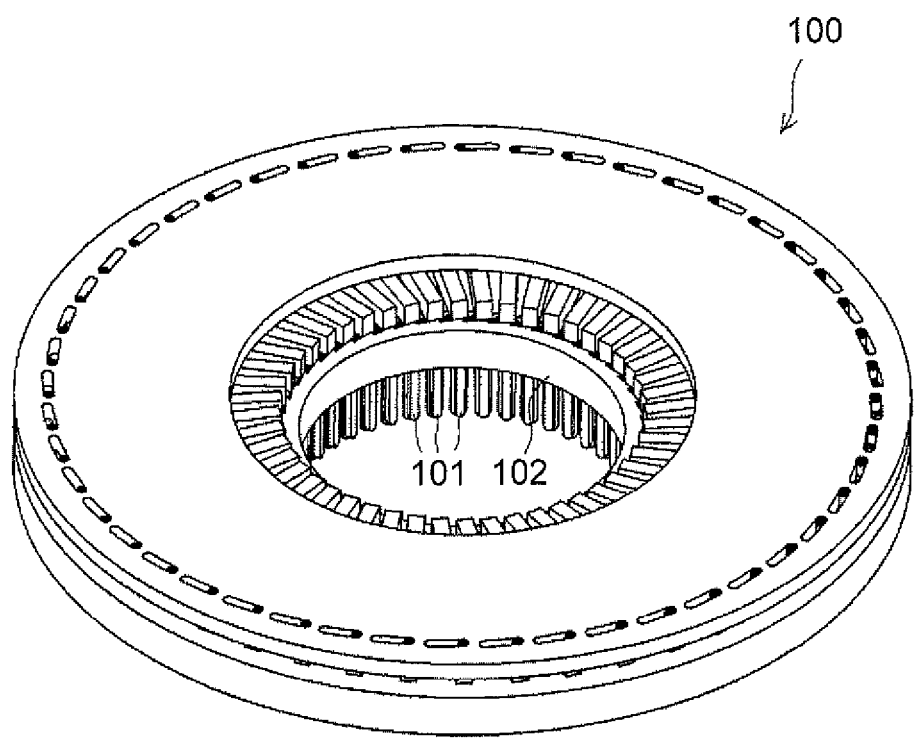
FIG. 8 is a perspective view illustrating a schematic configuration of a coil end bending jig according to one embodiment.
Figure 9:
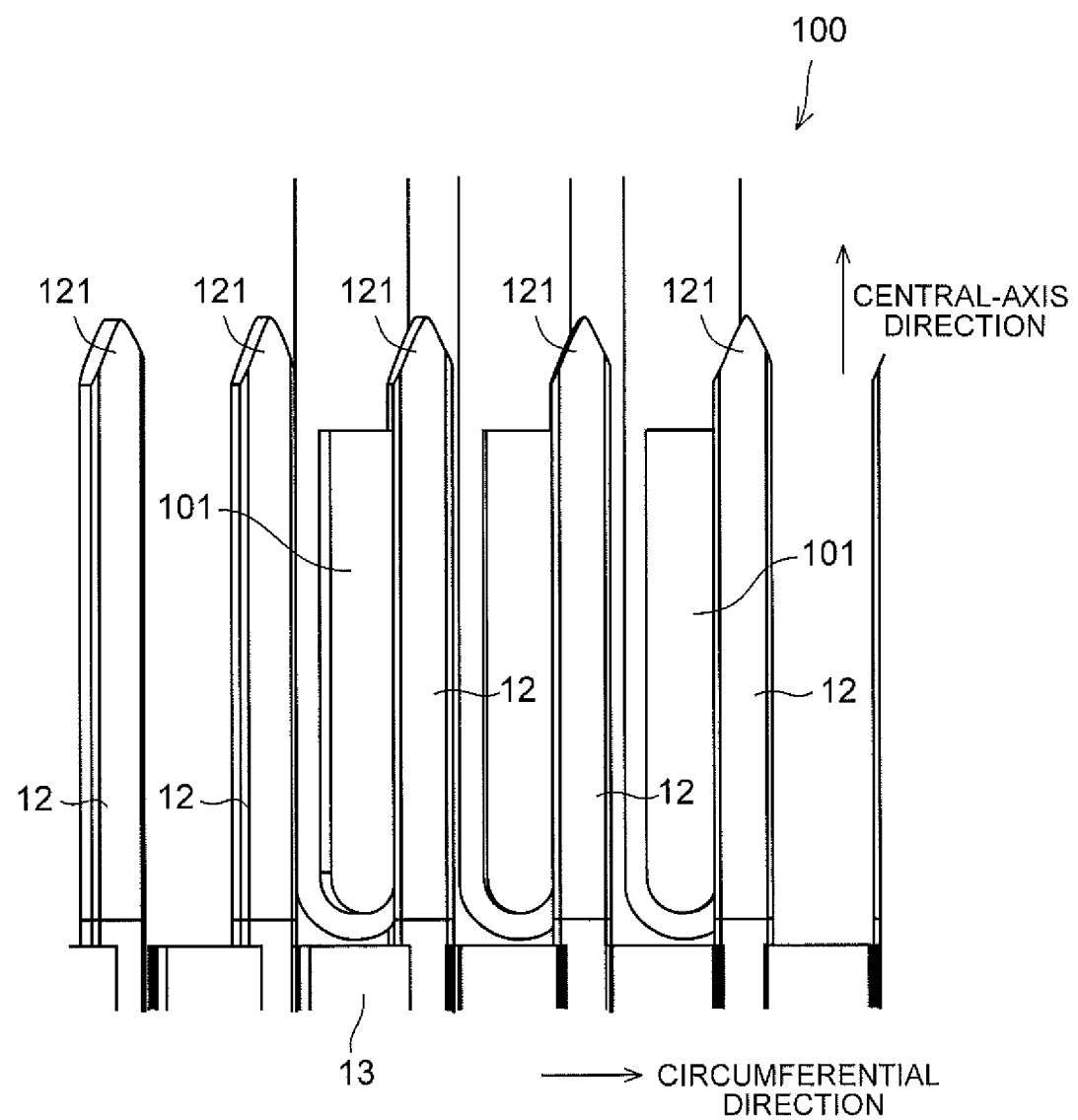
FIG. 9 is a view illustrating one example of a state where bending teeth of the coil end bending jig are inserted into respective spaces between the coil segments.

The tilting is performed by use of a toric coil end bending jig having a plurality of bending teeth, for example. FIG. 8 is a perspective view illustrating a schematic configuration of the coil end bending jig according to the present embodiment. In the stator core 13, the distal ends 121 of the coil segments 12 are concentrically provided in a standing manner in the central-axis direction. Initially, bending teeth 101 of the coil end bending jig 100 are moved down toward the stator core 13, so that the bending teeth 101 of the coil end bending jig 100 are inserted into respective spaces between the coil segments 12 of the stator core 13 (FIG. 9).

Figure 10:
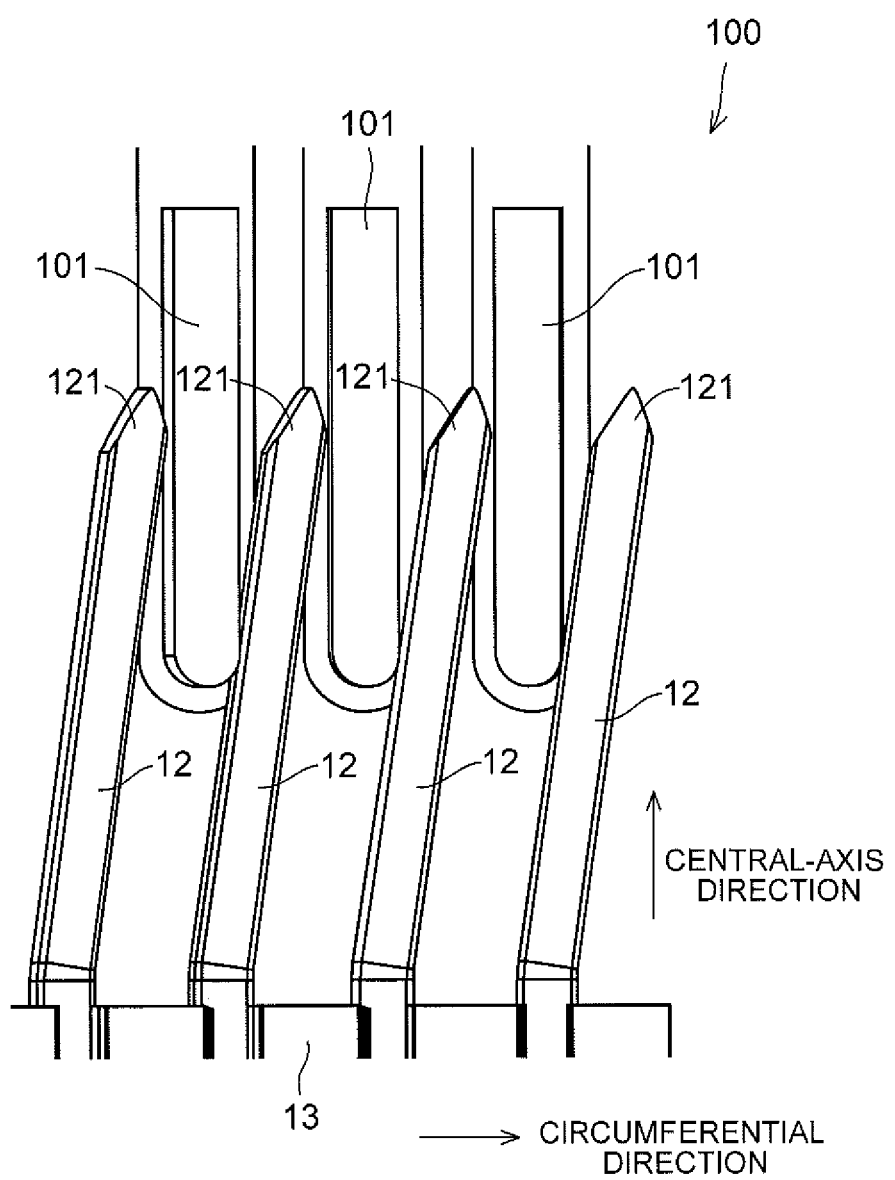
FIG. 10 is a view illustrating one example of a state where the coil segments are pushed down by the bending teeth.
Figure 11:
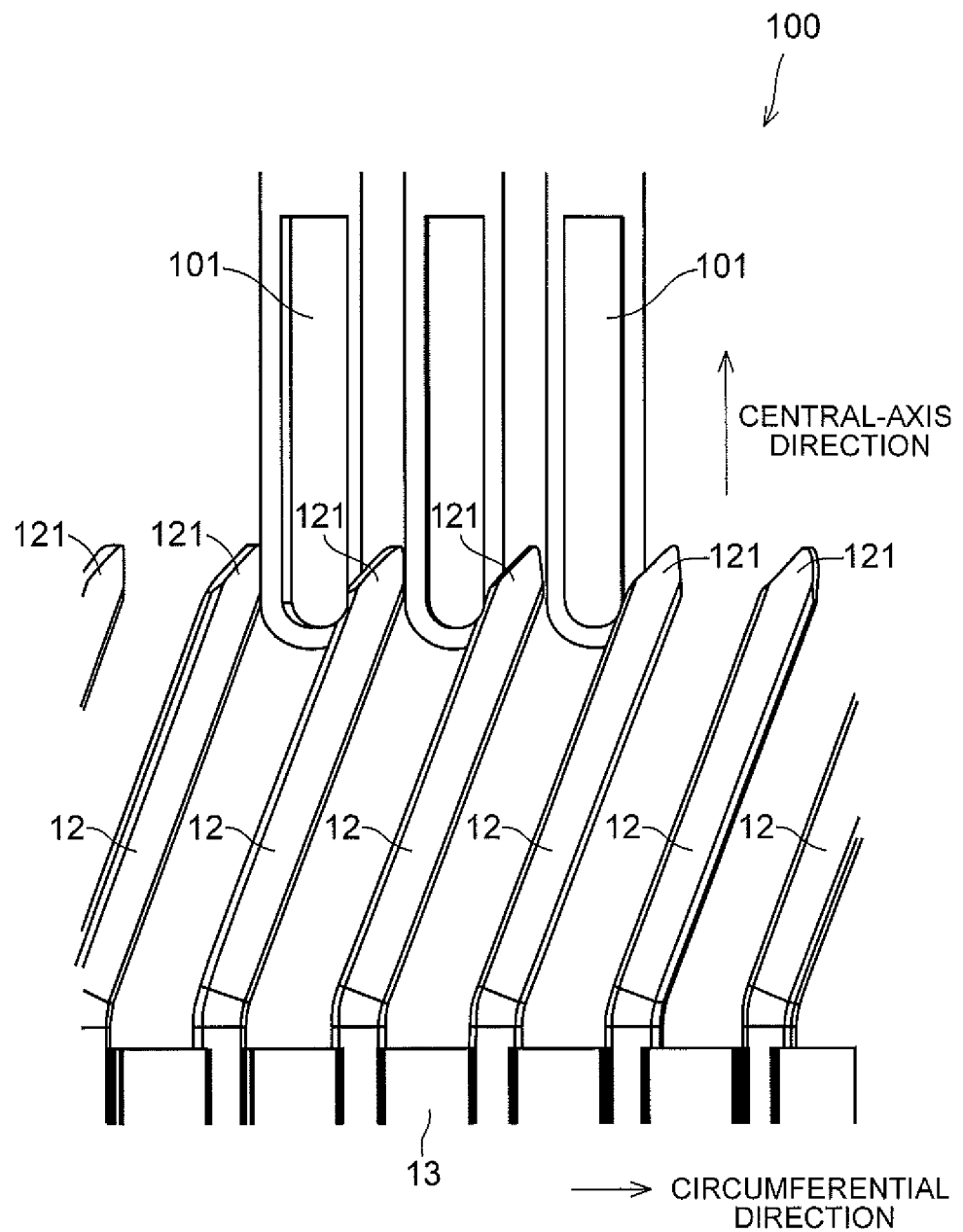
FIG. 11 is a view illustrating one example of a state where the coil segments are pushed down by the bending teeth.

Then, the bending teeth 101 of the coil end bending jig 100 are rotated clockwise while being gradually moved up relative to the coil segments 12 of the stator core 13 (FIG. 10). While the bending teeth 101 slide over the coil segments 12, the bending teeth 101 push down the coil segments 12 in the circumferential direction of the stator core 13 and in a clockwise direction (FIG. 11).

The pushing-down is performed from an inner peripheral side of the stator core 13 toward an outer peripheral side thereof per round. Note that, on a first round, the bending teeth 101 of the coil end bending jig 100 are rotated clockwise so as to push down the coil segments 12 of the stator core 13 in the circumferential direction of the stator core 13 and in the clockwise direction. However, on a second round, the bending teeth 101 of the coil end bending jig 100 are rotated counterclockwise so as to push down the coil segments 12 of the stator core 13 in the circumferential direction of the stator core 13 and in a counterclockwise direction. These processes are repeated alternately. By this process, the coil segments 12 are twisted linearly (without curves), so that the coil segments 12 are formed in a state as illustrated FIG. 7.

Here, guiding slits of a holder 102 are provided so as to guide the plurality of bending teeth 101 of the coil end bending jig 100 and extend slightly toward an outer peripheral side in a tangential direction with respect to an inner periphery of the coil end bending jig. On account of this structure, at the time when the coil segments 12 are pushed down by the bending teeth 101 of the coil end bending jig 100, the coil segments 12 are not just pushed down along the circumferential direction of the stator core 13, but are pushed down radially (in the tangential direction of the inner periphery) slightly toward the outer peripheral side of the inner periphery of the stator core 13. By this process, it is possible to restrain an unexpected physical interference between the bending teeth 101 of the coil end bending jig 100 and the coil segments 12 at the time when the coil segments 12 are pushed down.

Figure 12:
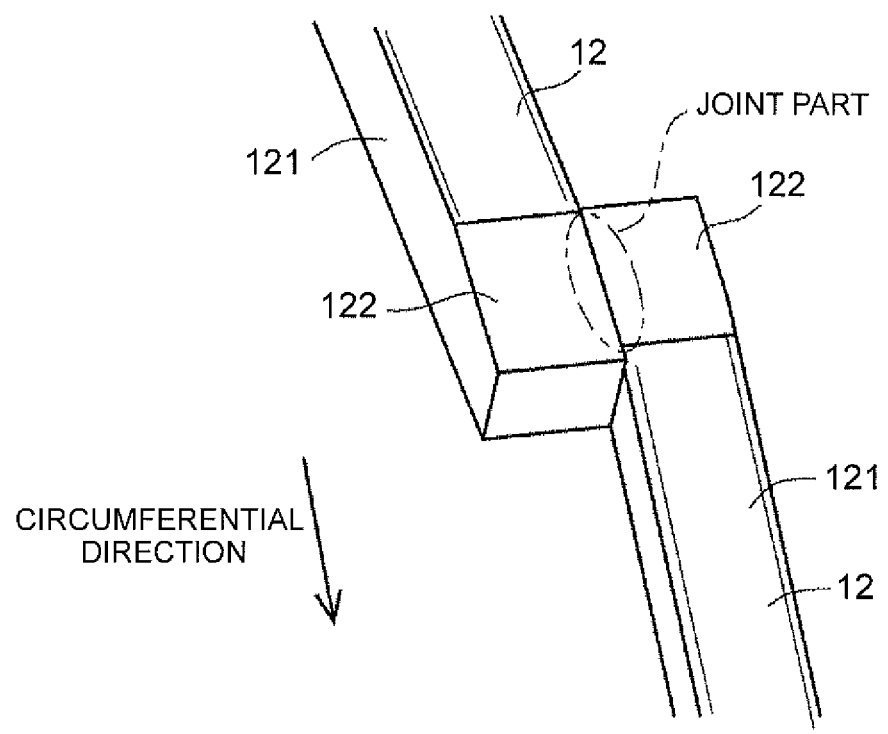
FIG. 12 is a view illustrating one example of a state where distal ends of adjacent coil segments are joined to each other.

In the joining step, as illustrated in FIG. 12, the distal ends 121 of the coil segments 12 tilted in the tilting step and adjacent to each other in a radial direction of the stator core 13 are joined to each other (step S109). In the joining step, in a state where peeled surfaces of the distal ends 121 of the adjacent coil segments 12 are brought into close contact with each other, cut surfaces 122 where copper is exposed are locally joined to each other by laser beam welding. By performing the local joining, it is possible to minimize damage to the coatings of the coil segments 12.

By performing the R-bending on the distal ends 121 of the coil segments 12 and then performing the laser beam welding to the cut surfaces 122 placed on the same plane in a state where the peeled surfaces of the distal ends 121 of the adjacent coil segments 12 make close contact with each other, it is possible to prevent laser penetration and falling-off. Note that the peeled surface of the distal end 121 of the coil segment 12 is only one surface that makes contact with a distal end 121 of its adjacent coil segment 12, which is a minimum necessary. This leads to a reduction in a machining cost. In the above example, the joining is performed by use of a laser, but is not limited to this. In order to minimize damage to the coating, the local joining by the laser beam welding is the most preferable, but the joining may be performed by conductive adhesive or soldering (using silver nanoparticles) at a low temperature.

In the present embodiment, the linear lead wire 10 is partially bent at regular intervals in the continuous direction of the lead wire 10 so as to form the plurality of bent portions 11, and then, the curve parts of the bent portions 11 thus formed are cut along the perpendicular plane with respect to the continuous direction of the lead wire 10. Thus, the coil segments 12 are cut out. By this process, the R-bending can be naturally performed on the distal ends 121 of the coil segments 12 in a state where the distal ends 121 have a coating. When the R-bending is thus performed on the distal ends 121, it is possible to secure a large insulation distance between the distal ends 121 adjacent to each other in the circumferential direction of the stator core 13 at the time when both distal ends 121 of the coil segments 12 are tilted in the circumferential direction of the stator core 13. Accordingly, since no cut margin (waste) is generated at all at the time of cutting the bent portions 11, a good yield is obtained. That is, according to the stator coil forming method of the present embodiment, no cut margin of the lead wire is generated, thereby making it possible to form the stator coil 1 with a good yield. Further, since the coating is left on the R-curve surface R1, it is not necessary to cover this part with an insulating material. Further, since no straight part is provided, it is possible to shorten the coil end height h.

The above embodiment is not limiting, and various modifications can be made. In the above embodiment, the peeling step, the cutting step, and the joining step are performed in this order after the bending step, but the order is not limited to this. For example, the cutting step, the peeling step, and the joining step may be performed in this order after the bending step. Alternatively, the bending step, the cutting step, and the joining step may be performed after the peeling step. Further, the bending step may be performed after the cutting step. In this case, a linear lead wire is cut at predetermined intervals along a perpendicular plane that is generally perpendicular to the continuous direction of the lead wire so as to cut out coil segments, and then, both ends of each of the coil segments are bent with respect to a continuous direction of the coil segment so as to form a bent portion.

What is claimed is:

1. A stator coil forming method comprising:
    a bending step of bending portions of a linear lead wire with respect to an extending direction of the lead wire, the lead wire fitted into a die, so as to form bent portions and shifting the linear lead wire in a stepped manner;
    a cutting step of cutting, with a cutting machine, curve parts of the bent portions, along a perpendicular plane that is perpendicular to an arc of the bent portions so as to form coil segments;
    after the cutting step, a U-shape forming step of bending the coil segments in a U-shape;
    an assembling step of inserting distal ends of the coil segments into a plurality of slots of a toric stator core so as to assemble the coil segments to the slots of the stator core, the plurality of slots extending parallel to a central axis of the stator core;
    a tilting step of tilting the distal ends of the coil segments, in a circumferential direction of the stator core so that cut surfaces of the distal ends are oriented toward a central-axis direction of the stator core; and
    a joining step of joining adjacent distal ends of the coil segments, the adjacent distal ends being adjacent to each other in a radial direction of the stator core, the adjacent distal ends each including a cut surface.

2. The method according to claim 1, wherein the bending step forms a plurality of the bent portions.

3. The method according to claim 1, wherein in the tilting step, the distal ends of the coil segments are tilted in the circumferential direction of the stator core and in a tangential direction to an inner periphery of the stator core.

4. The method according to claim 1, wherein a coating is provided on the lead wire, the stator coil forming method further comprising:
    a pressurization step of applying pressure to the bent portions toward one direction parallel to a cut direction of the bent portions so as to deform the bent portions; and
    a peeling step of peeling off the coating on respective end surfaces of the distal ends of the coil segments, the end surfaces being on a pressure-direction side of the bent portions.

5. The method according to claim 1, wherein the cut surfaces of the adjacent distal ends are locally joined to each other by laser beam welding.

6. The method according to claim 1, wherein the cut surfaces are surfaces where copper is exposed.

7. The method according to claim 1, wherein the bent portions are formed by fitting the lead wire into the die at positions determined in advance at regular intervals, the bent portions being formed in the lead wire in a lead-wire direction at regular intervals.

* * * * *